(12) United States Patent
Oyadomari et al.

(10) Patent No.: US 8,266,271 B2
(45) Date of Patent: *Sep. 11, 2012

(54) PROPAGATION OF SIGNALS BETWEEN DEVICES FOR TRIGGERING CAPTURE OF NETWORK DATA

(75) Inventors: Randy Oyadomari, San Jose, CA (US); Stephen Strong, Fremont, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1310 days.

This patent is subject to a terminal disclaimer.

(21) Appl. No.: 10/881,620

(22) Filed: Jun. 30, 2004
(Under 37 CFR 1.47)

(65) Prior Publication Data

US 2005/0060402 A1    Mar. 17, 2005

Related U.S. Application Data

(63) Continuation-in-part of application No. 10/238,358, filed on Sep. 10, 2002, now Pat. No. 6,941,482.

(60) Provisional application No. 60/484,208, filed on Jun. 30, 2003.

(51) Int. Cl.
*G06F 15/173* (2006.01)
(52) U.S. Cl. ......... 709/224; 709/223; 709/228; 709/248
(58) Field of Classification Search .......... 709/217–219, 709/223–229; 714/27–30
See application file for complete search history.

(56) References Cited

U.S. PATENT DOCUMENTS

| | | | |
|---|---|---|---|
| 4,434,466 A | 2/1984 | Friedli | |
| 4,484,264 A | 11/1984 | Friedli | |
| 4,792,753 A * | 12/1988 | Iwai | 370/244 |
| 4,945,473 A | 7/1990 | Holtey et al. | |
| 5,027,297 A | 6/1991 | Garitty et al. | |
| 5,175,818 A | 12/1992 | Kunimoto et al. | |
| 5,517,662 A | 5/1996 | Coleman | |
| 5,535,193 A * | 7/1996 | Zhang et al. | 370/253 |
| 5,557,744 A | 9/1996 | Kobayakawa | |

(Continued)

FOREIGN PATENT DOCUMENTS

WO    WO 01/52400 A1    7/2001

OTHER PUBLICATIONS

Hewlett Packard: "LAN Aggregation Through Switch Meshing", pp. 1-12, Jun. 1998.*

(Continued)

*Primary Examiner* — Kenny Lin
*Assistant Examiner* — Scott M Sciacca
(74) *Attorney, Agent, or Firm* — Volentine & Whitt, PLLC

(57) ABSTRACT

Protocol analyzers systems and methods coordinate the capture of network data of interest across multiple chassis. Each chassis has individual blades with accompanying ports and is serially connected to other chassis in the system. Selected ports from each chassis are configured in domains that can be spread across the serially connected chassis and used in coordination to capture network data of interest. A serial protocol containing control signals is used to transmit run, stop, and trigger data between the serially connected chassis and thereby coordinate the activity of ports within each domain. Through the use of the serial protocol the number of wires connecting adjacent chassis is minimized and each of the blades in the multi-chassis systems can be synchronously started, stopped, and triggered at the same time to synchronously capture the network data of interest.

30 Claims, 6 Drawing Sheets

U.S. PATENT DOCUMENTS

| | | | |
|---|---|---|---|
| 5,590,116 A * | 12/1996 | Zhang | 370/253 |
| 5,666,359 A * | 9/1997 | Bennett et al. | 370/358 |
| 5,696,701 A | 12/1997 | Burgess et al. | |
| 5,761,424 A | 6/1998 | Adams et al. | |
| 5,768,529 A | 6/1998 | Nikel et al. | |
| 5,812,529 A | 9/1998 | Czarnik et al. | |
| 5,850,386 A | 12/1998 | Anderson et al. | |
| 5,884,046 A | 3/1999 | Antonov | |
| 5,912,701 A * | 6/1999 | Morton, Jr. | 348/192 |
| 5,963,556 A * | 10/1999 | Varghese et al. | 370/401 |
| 6,049,545 A | 4/2000 | Stephenson et al. | |
| 6,058,116 A | 5/2000 | Hiscock et al. | |
| 6,098,157 A | 8/2000 | Hsu et al. | |
| 6,141,701 A | 10/2000 | Whitney | |
| 6,243,834 B1 | 6/2001 | Garrett | |
| 6,266,789 B1 | 7/2001 | Bucher et al. | |
| 6,268,808 B1 * | 7/2001 | Iryami et al. | 341/51 |
| 6,335,931 B1 * | 1/2002 | Strong et al. | 370/390 |
| 6,345,302 B1 | 2/2002 | Bennett et al. | |
| 6,360,262 B1 | 3/2002 | Guenthner et al. | |
| 6,366,583 B2 | 4/2002 | Rowett et al. | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,490,631 B1 | 12/2002 | Teich et al. | |
| 6,507,923 B1 * | 1/2003 | Wall et al. | 714/712 |
| 6,597,691 B1 | 7/2003 | Anderson | |
| 6,633,835 B1 * | 10/2003 | Moran et al. | 702/190 |
| 6,636,518 B1 | 10/2003 | Liencres | |
| 6,639,957 B2 | 10/2003 | Cahil-O'Brien et al. | |
| 6,654,356 B1 | 11/2003 | Eidson et al. | |
| 6,665,725 B1 | 12/2003 | Dietz et al. | |
| 6,724,729 B1 * | 4/2004 | Sikdar | 370/241 |
| 6,735,629 B1 * | 5/2004 | Cafarelli et al. | 709/224 |
| 6,751,676 B2 | 6/2004 | Fukuhara | |
| 6,757,725 B1 | 6/2004 | Frantz et al. | |
| 6,789,182 B1 * | 9/2004 | Brothers et al. | 712/30 |
| 6,793,539 B1 | 9/2004 | Lee et al. | |
| 6,925,052 B1 * | 8/2005 | Reynolds et al. | 370/217 |
| 6,941,482 B2 | 9/2005 | Strong | |
| 7,010,607 B1 * | 3/2006 | Bunton | 709/228 |
| 7,092,407 B2 * | 8/2006 | Ruhnow | 370/503 |
| 7,120,121 B2 * | 10/2006 | Sikdar | 370/241 |
| 7,120,680 B1 | 10/2006 | Higgins | |
| 7,173,934 B2 * | 2/2007 | Lapuh et al. | 370/392 |
| 7,222,313 B2 | 5/2007 | Bullis et al. | |
| 7,228,348 B1 * | 6/2007 | Farley et al. | 709/224 |
| 7,281,167 B2 | 10/2007 | Dube | |
| 7,492,061 B2 | 2/2009 | Beyers et al. | |
| 7,546,458 B1 * | 6/2009 | Singla et al. | 713/166 |
| 2002/0016874 A1 * | 2/2002 | Watanuki et al. | 710/51 |
| 2002/0054595 A1 * | 5/2002 | Ambe et al. | 370/390 |
| 2002/0146002 A1 * | 10/2002 | Sato | 370/386 |
| 2003/0014544 A1 | 1/2003 | Pettey | |
| 2003/0177497 A1 * | 9/2003 | Macrae et al. | 725/60 |
| 2003/0195958 A1 * | 10/2003 | Byron et al. | 709/224 |
| 2003/0225482 A1 * | 12/2003 | Topka et al. | 700/286 |
| 2004/0013117 A1 | 1/2004 | Hendel et al. | |
| 2004/0028038 A1 | 2/2004 | Anderson | |
| 2004/0148376 A1 | 7/2004 | Rangan | |
| 2004/0190502 A1 | 9/2004 | Sharma | |
| 2005/0010691 A1 | 1/2005 | Oyadomari et al. | |
| 2005/0060402 A1 | 3/2005 | Oyadomari et al. | |
| 2005/0060413 A1 | 3/2005 | Oyadomari et al. | |
| 2005/0114663 A1 | 5/2005 | Cornell et al. | |
| 2005/0114697 A1 | 5/2005 | Cornell et al. | |
| 2005/0114710 A1 | 5/2005 | Cornell et al. | |
| 2005/0278760 A1 | 12/2005 | Dewar | |
| 2006/0139854 A1 | 6/2006 | Beyers et al. | |
| 2007/0081549 A1 | 4/2007 | Cicchetti et al. | |
| 2007/0189171 A1 | 8/2007 | Abrahams | |
| 2007/0253349 A1 | 11/2007 | Light et al. | |
| 2008/0013467 A1 | 1/2008 | Light et al. | |
| 2008/0014879 A1 | 1/2008 | Light et al. | |
| 2008/0034120 A1 | 2/2008 | Oyadomari et al. | |
| 2008/0075103 A1 | 3/2008 | Noble et al. | |
| 2008/0126874 A1 | 5/2008 | Oyadomari et al. | |
| 2008/0253293 A1 | 10/2008 | Beyers | |

OTHER PUBLICATIONS

U.S. Appl. No. 10/868,631, filed Jun. 14, 2004, Oyadomari et al.
U.S. Appl. No. 10/882,711, filed Jun. 30, 2004, Oyadomari et al.
U.S. Appl. No. 10/238,358, mailed Apr. 26, 2005, Notice of Allowance.
U.S. Appl. No. 10/868,631, mailed Sep. 5, 2008, Office Action.
U.S. Appl. No. 10/882,711, mailed Apr. 28, 2008, Office Action.
Peter Burden, *Routing in the Internet*, Webopedia, available at http://www.scit.wlv.ac.uk/~jphb/comms/iproute.html, last visited Mar. 2, 2005.
Keith Schultz, *A Complete Solution, Enterasys Networks proves its mettle in enterprise-class switching*, Internetweek.Com, Jan. 22, 2001, available at http://www.internetweek.com/reviews01/rev012201.htm.
Web page: Marvell Press Release, *Galileo Announces New High-Performance 240-port Ethernet Switch Reference Design*, Sep. 13, 1999.
U.S. Appl. No. 10/882,771, mailed Apr. 28, 2008, Office Action.
U.S. Appl. No. 10/882,771, mailed Nov. 25, 2008, Office Action.
U.S. Appl. No. 10/882,771, mailed May 18, 2009, Office Action.
U.S. Appl. No. 10/882,771, mailed Feb. 18, 2010, Office Action.
U.S. Appl. No. 10/868,631, mailed Jun. 4, 2009, Notice of Allowance.

* cited by examiner

PROPAGATION OF SIGNALS BETWEEN DEVICES FOR TRIGGERING CAPTURE OF NETWORK DATA

CROSS-REFERENCE TO RELATED APPLICATIONS

This application claims the benefit of U.S. Provisional Application No. 60/484,208, filed Jun. 30, 2003, which is hereby incorporated herein by reference. This application is also a continuation-in-part of U.S. patent application Ser. No. 10/238,358, now U.S. Pat. No. 6,941,482, filed Sep. 10, 2002, entitled "Systems and Methods for Synchronizing Time Stamps," which is incorporated herein by reference.

BACKGROUND OF THE INVENTION

1. The Field of the Invention

The present invention relates generally to multi-channel high speed communications systems, methods, and devices useful in analyzing communications traffic. More particularly, embodiments of the invention relate to systems and methods for coordinating the operation of various chassis, blades, ports, and analyzers in a multi-chassis protocol analyzer system.

2. The Relevant Technology

Computer and data communications networks continue to develop and expand due to declining costs, improved performance of computer and networking equipment, and increasing demand for communication bandwidth. Communications networks, including for example, wide area networks ("WANs"), local area networks ("LANs"), and storage area networks ("SANs") allow increased productivity and utilization of distributed computers or stations through the sharing of resources, the transfer of voice and data, and the processing of voice, data, and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Gigabit Ethernet, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types has different sets of standards, referred to as protocols, which set forth the rules for accessing the network and for communicating among the resources on the network.

Typically, transmissions between two network connected devices are passed through a hierarchy of protocol layers at each of the connected devices. Each layer in the first network connected device essentially carries on a conversation with a corresponding layer in the second network connected device, in accordance with an established protocol that defines the rules of communication between the layers.

As communication networks have increased in number, size and complexity however, they have become more likely to develop a variety of problems that are increasingly difficult to diagnose and resolve. Moreover, the demands for network operational reliability and increased network capacity, for example, emphasize the need for adequate diagnostic and remedial systems, methods and devices.

Exemplary causes of network performance problems include the transmission of unnecessarily small frames of information, inefficient or incorrect routing of information, improper network configuration and superfluous network traffic, to name just a few. Such problems are aggravated by the fact that many networks are continually changing and evolving due to growth, reconfiguration and introduction of new network typologies and protocols, as well as the use of new interconnection devices and software applications.

Consequently, as high speed data communications mature, many designs increasingly focus on reliability and performance issues. In particular, communications systems have been designed to respond to a variety of network errors and problems, thereby minimizing the occurrence of network failures and downtimes. In addition, equipment, systems and methods have been developed that allow for the testing and monitoring of the ability of a communications system to respond to and deal with specific types of error conditions on a network. In general, such equipment, systems, and methods provide the ability to selectively alter channel data, including the introduction of errors into channel data paths.

One device that is used to detect these errors is a protocol analyzer, also called a network analyzer. A protocol analyzer runs in the background of a network, capturing, examining and logging packet traffic. Protocol analyzers can, for example, be configured to watch for unusual IP addresses, time stamps and data packets, and most have a user interface for enabling the network administrator to have access to information representing the analysis performed by the protocol analyzers. Protocol analyzers are thus a fundamental and highly useful tool for testing and debugging various types of communications networks, including computing and computer storage networks. A protocol analyzer operates by capturing selected portions of data from a data stream that is transmitted via the communications network. The captured information may then be analyzed in greater detail by the protocol analyzer to extract desired information. For instance, data transmission faults or errors, or performance errors, known generally as problem conditions, may be diagnosed by examining the captured data that is related to the problem. Hacking can also be detected through a protocol analyzer.

Protocol analyzers can be transparent to a network(s) or be configured as gateways or switching networks. Regardless, they include ports (physical connections) to the networks. The ports provide connectivity to the networks and permit the protocol analyzers to receive and capture network data. The ports are often provided on a blade (or card) that is often contained in a chassis (or box) with a common backplane or bus. The chassis may be modular, thereby allowing multiple chassis to be mounted to a rack in a customizable and expandable system. Such multi-chassis protocol analyzer systems provide access to a large number of ports over numerous blades that can be used for various purposes.

As networks have become more complex and sophisticated, protocol analyzers with increasing numbers of ports have been developed, enabling the protocol analyzers to be configured for use with different data links or channels. It is often desirable to associate some of these ports into a single logical grouping or domain for coordinated activity. The increasing numbers of ports, however, also increases the complexity of protocol analyzers and presents the problem of coordinating among ports to capture network data in a way that enables the time sequence of the data transmitted in multiple channels or data links to be accurately represented.

If the ports in the domain are all located within a single chassis the transfer of signals between ports can be performed in parallel. Between chassis, however, data transfer is constrained by the number of cables that interconnect the boxes. It therefore becomes a complicated task to coordinate the activity of multiple ports interconnected in multiple domains on multiple blades over multiple chassis. This coordination becomes even more particularly difficult when an analyzer is reviewing multiple channels.

Accordingly, there is a continuing need for improved methods and devices for configuring and operating protocol analyzers that are configured in multi-chassis systems.

BRIEF SUMMARY OF THE INVENTION

The present invention provides systems and methods in which multiple protocol analyzer chassis, or boxes, each with individual blades and ports, are serially chained together and allow data to be captured from multiple ports in a domain that can be spread across the serially connected chassis. In addition, this invention relates to a system by which a serial protocol is used to transmit run, stop, and trigger data between the serially connected protocol analyzer chassis. Through the use of the serial protocol, the number of wires connecting the chassis can be minimized and each of the blades can be synchronously started, stopped, and triggered at the same time to synchronously capture network data of interest.

The multi-chassis systems have a triggering mode by which triggering to capture data based on the identification of data of interest is synchronized between chassis. The trigger information is on a domain-by-domain basis to coordinate data capture over the multiple chassis. Each chassis can be programmed to send run/stop and trigger information in either the upstream or downstream directions, or both.

In normal operations of the invention ports (for simplicity in describing the invention, as used herein the term "ports" includes within its scope the protocol analyzers coupled to the ports) perform two basic operations, both of which are defined by software that an configures the ports in the blades to monitor and capture the data as desired by the network administrator. First, the ports filter data packets associated with the communications traffic that is being monitored to capture only those packets that are of interest, such as only packets between two specified nodes in the network. This is performed after the master chassis sends a run signal to the slave chassis. The filtering is performed and the data that has been appropriately filtered is captured in capture buffers associated with the ports, while the rest of the data is discarded.

The other basic operation is triggering, which is performed when a certain bit pattern in the filtered packets is identified. Any chassis that triggers sends the trigger signal to the other ports in the domain to cause them also to trigger. The triggering typically results in a trigger flag being placed in the capture buffer. Alternately, the triggering can be used to begin the capture process. The capture continues after the trigger until one of the ports has filled its capture buffer or until the network administrator stops the process.

Once the data has been captured and the trigger has occurred, the network administrator can look at all of the traces derived from the captured data on one screen and see the data captured from all ports at once, all of which were triggered as substantially the same moment. The network administrator can then look at what was happening on other ports when the trigger occurred.

According to a first exemplary embodiment of the invention a method for capturing network data of interest includes first receiving communications traffic through a domain of ports on a protocol analyzer, wherein the domain of ports is distributed over a plurality of chassis. The communications traffic is then monitored by one or more analyzer modules in communication with each port to identify data of interest. Finally, one or more control signals are delivered between the plurality of chassis using a serial protocol, wherein the control signals coordinate the operation of each port in the domain of ports.

According to another exemplary embodiment of the invention a method for capturing network data of interest in coordination across multiple chassis includes first configuring a domain of ports located over one or more blades on one or more chassis, each port in the domain being in communication with a respective analyzer module and a respective capture buffer. At each analyzer module, data transmitted via the communications network is monitored in order to identify network data of interest. In response to an analyzer module attached to one of the ports in the domain identifying the network data of interest, each capture buffer in communication with each port in the domain is triggered to capture a desired portion of the data transmitted via the communications network.

Yet another exemplary embodiment is a method for capturing network data of interest that includes first providing a multi-chassis protocol analyzer system, each chassis including first and second cable receptacles for inter-chassis communications and housing at least one blade, each blade including at least one port for connecting to a computer network, each port further being in communication with both a capture buffer and an analyzer module. A plurality of the ports are configured into a domain located over at least two of the chassis. A serial protocol containing a run signal to place the domain of ports in a run mode is next transmitted through at least one of the first and second cable receptacles. The run mode enables communications traffic to be received through the domain of ports and the communications traffic to be monitored by the analyzer modules in communication with the domain of ports to identify data of interest. Finally, in response to a triggering event a serial protocol containing trigger signals is generated and transmitted through at least one of the first and second cable receptacles. The serial protocol contains a trigger signal for propagation to each of the ports in the domain and is operable to trigger the capture buffer in communication with each port in the domain to capture a selected portion of the communications traffic.

An exemplary system according to the invention includes a first chassis and a second chassis with each chassis including at least one blade. Each blade includes a capture buffer for capturing network data of interest; an analyzer for monitoring network data, identifying network data of interest, and triggering the capture of the network data of interest in the capture buffer; and at least one port for receiving network data and routing it to the capture buffer and/or the analyzer, wherein the at least one port in the first chassis and the at least one port in the second chassis include a domain of ports. Each chassis also includes a field programmable gate array capable of analyzing a serial protocol communicated between the first chassis and the second chassis to identify which of one or more control signals in the serial protocol is applicable to the ports located on each chassis.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and, are therefore not to be considered limiting of its scope. The invention will be described and explained with additional specificity and detail through the use of the accompanying drawings in which.

DETAILED DESCRIPTION OF THE INVENTION

Figure 1:
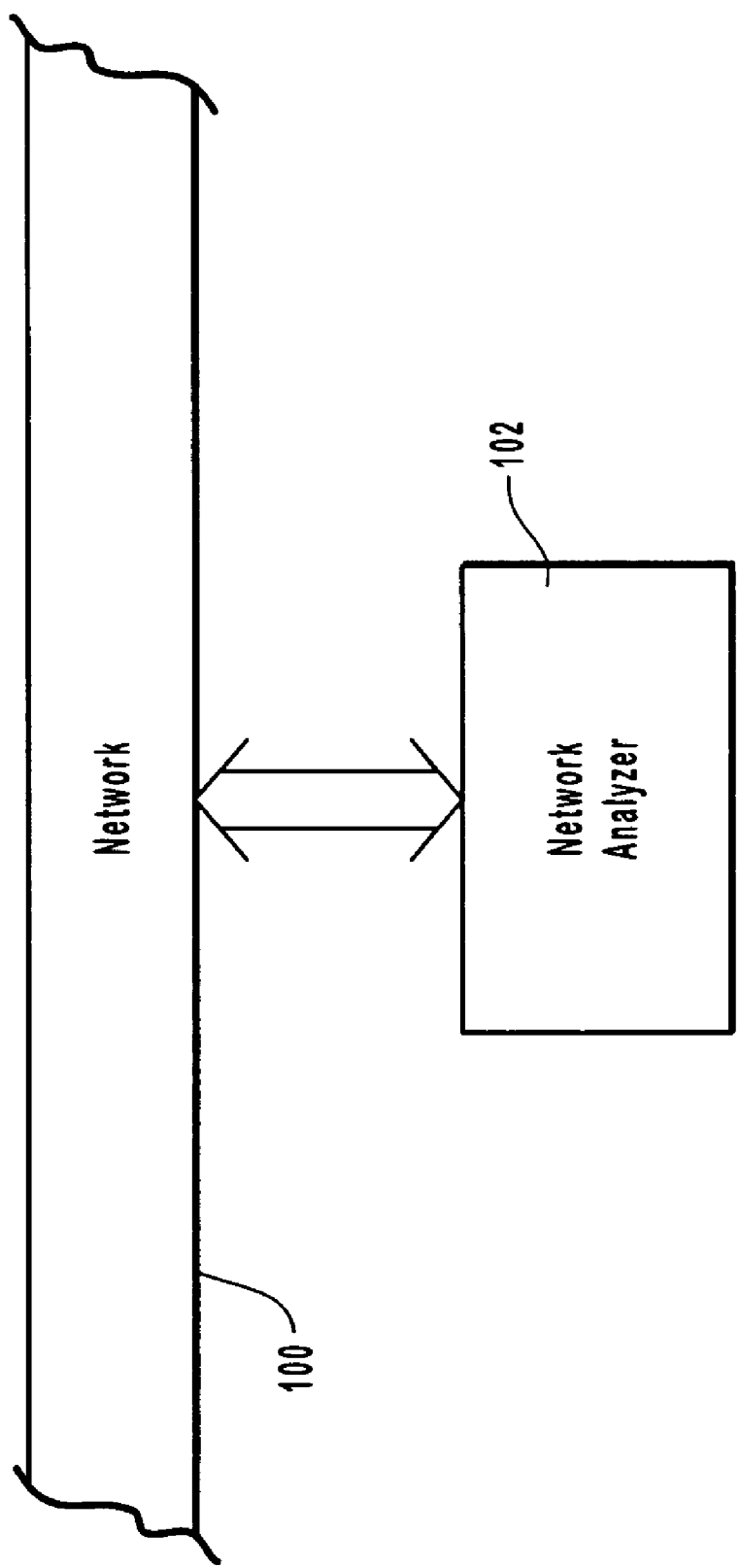
FIG. 1 is a schematic diagram that illustrates the relation of a protocol analyzer with respect to a computer network according to embodiments of the invention.

In general, embodiments of the invention are concerned with a system in which multiple protocol analyzer chassis, or boxes, each with individual blades and ports, are serially chained together to allow data to be captured from multiple ports in a domain that can be spread across the serially connected chassis. In particular, this invention relates to the part of the "Normal Mode" of the system by which a serial protocol is used to transmit run, stop, and trigger data between the serially connected network protocol chassis. Through the use of the serial protocol, the number of wires connecting the chassis can be minimized and each of the blades across the chassis can be synchronously started, stopped, and triggered at the same time to synchronously capture network data of interest.

Related embodiments in which the protocol analyzer chassis are operated in a "Discovery Mode" to discover and configure multiple ports over one or more chassis into respective domains and sync-groups are described in U.S. patent application Ser. No. 10/868,631, entitled "Discovery and Self-Organization of Topology in Multi-Chassis Systems," filed Jun. 14, 2004, now U.S. Pat. No. 7,827,248, and claiming the benefit of Provisional Application No. 60/479,735; both of which are incorporated herein by reference. Other related embodiments in which the configured sync-groups are operated in the "Normal Mode" to effect synchronization of timestamps to compensate for communication latency between chassis are described in U.S. patent application Ser. No. 10/882,711, entitled "Synchronization of Timestamps to Compensate for Communication Latency Between Devices," filed Jun. 30, 2004 and claiming the benefit of Provisional Application No. 60/483,993; both of which are also incorporated herein by reference. This patent application discloses in detail the synchronization methods that can be used to account for the timing of network data that is simultaneously captured using ports located in different protocol analyzer chassis.

Generally, embodiments of the present invention connect each chassis in a serial chain to as many as two other chassis, one in the upstream direction and one in the downstream direction. Within a single chassis, dedicated signals from every port can be used to transmit data between a blade and a motherboard or between blades. Between multiple chassis, however, there are a limited number of cables to connect every chassis together. In general, there are fewer cables between any two chassis than the number of domains, or logical groupings, of ports. Rather than using a dedicated cable between adjacent chassis for each port, the cables implement a protocol, defined hereinbelow, which permits serial communication for multiple domains to be achieved on a single or relatively small number of cables. In addition, because the length of the chain is not predetermined, it is impossible to predict how long the chain might be and provide a signal for each port.

The chain can be divided into one or more sync-groups, each sync-group having a master chassis, zero or more slave chassis, and two end points. Each chassis is configured to ignore data from chassis that are not included in its sync-group. The ports of each sync-group are configured into domains that operate within the sync-group to capture data of interest. Generally, the most upstream chassis in a sync-group is declared to be the master, with the other(s) being slaves. The master coordinates the start, stop, and triggering within the sync-group, with the master being responsible for synchronously starting the boxes in a chain while any chassis can generate a trigger, or stop all the chassis in the chain.

In particular, embodiments of the invention enable the start, stop, and trigger of blades and ports over the multiple chassis in a chain at substantially the same time for improved synchronous operation of analyzers linked to ports on the blades. Thus, the delay is minimized between the event starting the run/stop/trigger and each of the ports in the domain over the multiple chassis seeing the event and responding accordingly.

In normal operation of the protocol analyzer systems, ports (for simplicity in describing the invention, as used herein the term "ports" may include within its scope the protocol analyzers coupled to the ports) perform two basic operations, both of which are defined by software that configures the ports in the blades to monitor and capture the data as desired by the network administrator. First, the ports filter data packets associated with the communications traffic that is being monitored to capture only those packets that are of interest, such as only packets between two specified nodes in the network. This is performed after the master chassis sends a run signal to the slave chassis. The filtering is performed and the data that has been appropriately filtered is captured in capture buffers associated with the ports, while the rest of the data is discarded.

The other operation is triggering, which is performed when a certain bit pattern in the filtered packets is identified. Any chassis that triggers sends the trigger signal to the other ports in the domain to cause them also to trigger. The triggering typically results in a trigger flag being placed in the capture buffer. Alternately, the triggering can be used to begin the capture process. The capture continues after the trigger until one of the ports has filled its capture buffer, the trigger signal is propagated to the other ports in the domain to capture and stop running, or until the network administrator stops the process.

The use of trigger signals enable the capture of data and the triggering based on the identification of data of interest to be synchronized between chassis. The run/stop/trigger information is sent between chassis on a domain-by-domain basis rather than port by port as may be performed in intra-box operations. Each chassis can be programmed to send run/stop and trigger information in either the upstream or downstream directions, or both. Each chassis also has control registers that can inhibit the transmission or reception of run/stop/trigger information to/from either the upstream or downstream direction.

Once the data has been captured and the trigger has occurred, the network administrator can look at all of the traces derived from the captured data on one screen and see the data captured from all ports at once, all of which were triggered as substantially the same moment. The network administrator can then look at what was happening on other ports when the trigger occurred.

As a practical matter, the present invention is often tied to a particular hardware implementation. The particular hardware configuration discussed herein, however, is for illustrative purposes and the present invention is not necessarily limited to any specific hardware configuration. Various embodiments of the present invention may comprise a special purpose or general-purpose computer including various computer hardware, as discussed in greater detail below.

As used herein, the terms "protocol analyzer" and "network analyzer" are used interchangeably and relate to devices having hardware or software for performing network troubleshooting, monitoring, network data analysis, network performance analysis, diagnosis, traffic simulation, bit error rate testing, network jamming, or other procedures that are conventionally performed by protocol analyzers or network analyzers. Protocol analyzers and network analyzers represent examples of special-purpose computers that can perform the operations associated with the methods described herein.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

Reference is first made to FIG. 1, which shows a simplified view of a portion of a communications network, generally designated at 100. The communications network 100 may include, for illustrative purposes, a portion of a wide area network (WAN), a local area network (LAN), a storage area network (SAN), or other networks known in the art. The communications network 100 includes various components that communicate with one another via the network, including for example, computers, servers, and mass storage devices. Transmitted data exchanged between these components and others known in the art is referred to herein as communications traffic or network traffic. The communications traffic is transmitted via network components by processes well known in the art. The data contained in the communications traffic can comprise both physical protocols, which characterize the nature or formatting of the data, and logical protocols that include the content of the data itself.

As seen in FIG. 1, a protocol analyzer 102 is disposed in relation to the communications network 100 so as to be able to monitor communications traffic on the communications network 100. It is appreciated, however, that the protocol analyzer can be interconnected with the communications network 100 in any one of a variety of configurations, and thus is not limited to the particular configuration shown in FIG. 1. For example, the protocol analyzer may analyze communications traffic between any two nodes of the network, such as between a server and a computer terminal or a mass storage device. As explained herein, the protocol analyzer 102 may be employed to detect and debug erroneous or aberrant data communications that are included in the communications traffic. The protocol analyzer 102 may be configured to operate transparently to network 100. Alternatively, the protocol analyzer 102 can serve as part of a gateway to various devices in or portions of the network.

Figure 2:
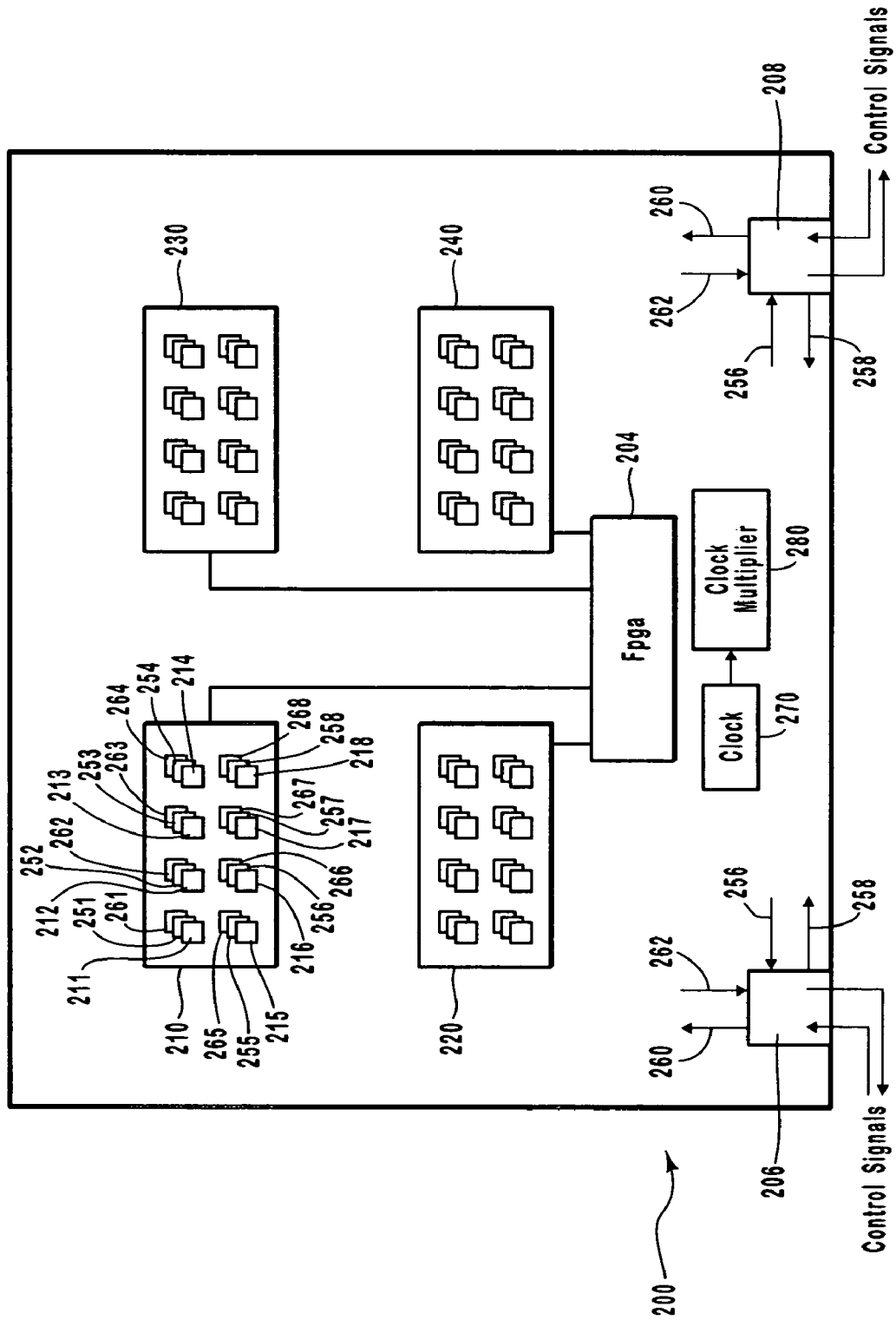
FIG. 2 is a block diagram representing a chassis according to embodiments of the invention.

Referring now to FIG. 2, depicted is a block diagram that illustrates an exemplary protocol analyzer chassis 200. Generally, a chassis is the physical frame or structure of a computer system or other multi-component device. A chassis may be mounted to a rack in a modular fashion allowing multiple chassis to be mounted to the rack. Selected chassis may be configured in a sync-group for synchronous operation. Such a configuration of chassis may be configured as a protocol analyzer, such as for example protocol analyzer 200. Each chassis supports a particular number of blades and each blade supports a particular number of ports. Chassis 200 thus provide access to a large number of ports that can be used for various purposes, such as analyzing network communications traffic. The various blades may be electrically interconnected by field programmable gate array (FPGA) 204, for example.

The protocol analyzer chassis 200 includes four blades, illustrated as blades 210, 220, 230, and 240. A blade is generally configured as a thin, energy and cost-efficient electronic circuit board that is designed to be plugged or positioned in a chassis with other blades like a book in a library shelf. Although the depicted embodiment contains four blades, chassis according to embodiments of the invention may have various numbers of blades, such as for example, one, two, or four. It will be appreciated by those skilled in the art that the above described physical configuration of blades in relation to chassis is by way of example only, and other configurations will be compatible, in view of the teachings herein, with the embodiments of the invention.

Blade 210 includes ports 211, 212, 213, 214, 215, 216, 217, and 218 in communication with capture buffers 251, 252, 253, 254, 255, 256, 257, and 258 and analyzer modules 261, 262, 263, 264, 265, 266, 267, and 268. With reference to ports 211, 212, 213, 214, 215, 216, 217, and 218, a port is generally a specific place on a networked device for being physically connected to some other device, usually with a socket and plug of some kind. The ports 211, 212, 213, 214, 215, 216, 217, and 218 physically connect to the transmission medium of the network and can be used to assist in monitoring network traffic and capturing data of interest. It is the need to have ports that can operate in conjunction with other ports that has led to the development of chassis, such as chassis 200 that support a certain number of blades which in turn support a certain number of ports. Protocol analyzer 200 thus has multiple ports, analyzers, and capture buffers that can be used to collectively capture and analyze data that is transmitted on different data links in a network, such as network 100, or in different channels in the network.

Each blade supports a plurality of ports, such as two, four, or eight. The blade 110, for example, includes or supports the ports 211, 212, 213, 214, 215, 216, 217, and 218. The other blades 220, 230, and 240 of protocol analyzer chassis 200 similarly include or support a number of ports (as well as capture buffers and analyzer modules). The ports may be either unidirectional or bi-directional ports. Additionally as described in greater detail below, each port is preferably included within a domain, or group of one or more ports that operate collectively.

As previously mentioned, connected to each port 211, 212, 213, 214, 215, 216, 217, and 218, respectively, are capture buffers 251, 252, 253, 254, 255, 256, 257, 258 and analyzer modules 261, 262, 263, 264, 265, 266, 267, and 268. The protocol analyzer 200 is thereby configured to enable the capture of desired data contained in the traffic of a communications network. The capture of the data may be triggered by one of the analyzer modules detecting a selected datum or event in the communications traffic, such as one or more statistical characteristics of that data. One such embodiment of detecting statistical data is further disclosed in copending U.S. patent application Ser. No. 10/218,343, now U.S. Pat. No. 7,228,348, filed Aug. 13, 2002, incorporated herein by reference.

In the following discussion it will be appreciated that the interactions of port 211, capture buffer 251, and analyzer module 261 are exemplary of the interactions of each of the ports, capture buffers, and analyzer modules depicted in FIG. 2. With reference to port 211 and traffic capture buffer 251, the traffic capture buffer 251 is configured to receive communications traffic from, for example, network 100 via port 211. The traffic capture buffer 251 receives the communications traffic in a continuous fashion from the port 211. The traffic capture buffer 251 is configured to store the data until it is overwritten by subsequent incoming data from the port 211. In one embodiment, data capture by the traffic capture buffer 251 is performed in a circular manner such that once the buffer is filled, any new data that is added will overwrite the oldest data that is present in the buffer. Thus, it is seen that a given data packet within the captured communications traffic remains in the traffic capture buffer 251 for only a limited time before being overwritten by new, incoming data. Alternatively, only selected data is stored in the capture buffer according to filtering operations as disclosed herein.

Ports and the associated analyzer module and capture buffers perform both filtering and triggering operations. In particular, the filter operation looks for a certain type of data that it wants to capture, such as certain types of packets. In some embodiments it may look for all packets, packets that contain a certain piece of information, a certain type of packet from a certain port to another port, an error, statistical information, or other network data of interest. Thus, the filter passes all types of traffic that are not currently of interest to the analyzer while storing or capturing data that is of interest.

Triggering operations generally include stopping the capture of data so that a static collection of data in the capture buffers is maintained. A trigger may be generated if a selected data of interest is identified, for example, or if a capture buffer that is being filled by filtering operations becomes filled. The trigger operation may direct each port in a domain to stop immediately or to capture data for a period of time and then stop so that the capture buffer contains network from before and after the network data of interest was identified. As further explained hereinbelow, the trigger command is generated at a single port and then communicated to each port in the domain via a serial protocol for coordinated action.

As previously mentioned, running port 211 delivers a constant stream of data to analyzer module 261. The analyzer module 261 thereby monitors the communications traffic to determine whether a selected trigger condition has been met, according to the defined parameters. If the triggering condition is not met, gathering and processing of incoming data in the communications traffic is continued by the analyzer module 261. If the trigger condition is met and the trigger signal is implemented, the port 211, which has an input line connected to the trigger signal line, terminates the stream of traffic being sent to the traffic capture buffer 251. Thus, data leading up to the triggering event is preserved within the traffic capture buffer 251, enabling it to be further analyzed at the network administrator's discretion.

In yet another embodiment, the port 211, upon being activated when the trigger condition is met, can alternatively clear the traffic capture buffer 251 of any data contained therein, and start the gathering of new incoming data from the point when the trigger condition was met. This post-event data capture is useful to examine the response of the communications network to the triggering event, such as how well the network can recover from a problem condition, or how the state of the network is altered when a certain triggering event occurs. This option may be desired when a trigger condition based upon transactional events between network components is used.

Finally, some embodiments allow for a combination of the above two configurations to be utilized, wherein data from both before and after the triggering event are preserved in the traffic capture buffer 251. In this case, the first portion of the traffic capture buffer will be filled with data leading up to the triggering event, while the second portion of the buffer is filled with data immediately following the event. In many instances, this configuration is preferred as it provides a "before and after" view of the communications traffic.

By way of example, analyzer module 261 may be a network traffic generator, such as a network traffic generator having functionality similar to that of the GTX-G Generator, which is a product of Finisar Corporation, of Sunnyvale, Calif. A network traffic generator enables a network administrator or another user to generate data to test both Fibre Channel and Inifiband networks by allowing network administrators to generate and view detailed network responses.

Another analyzer module for use on the blades is an error injection device, such as those that have functionality similar to that of the GTX-J Jammer Module, which is a product of Finisar, Corporation. Error injection allows a network administrator to inject errors into a network in real time and verify that the recovery process operates correctly.

Yet another analyzer module for use in conjunction with the ports is a Bit Error Rate Tester (BERT). A BERT enables verification of data integrity in a local, metro, or wide area networks and can test the integrity of both passive and active components in a network. This is accomplished by sending worst-case data patterns through network devices and analyzing the error rate that is introduced by the passive or active components.

The protocol analyzer chassis 200 further includes, by way of example, a field programmable gate array (FPGA) 204 or other similar module. The FPGA 204 is an integrated circuit incorporating an array of programmable logic gates that are not pre-connected but where the connections are programmed electrically by the network administrator. The FPGA 204 can be used, for example, to direct various signals to various ports. The FPGA 204 is also used to program each port to a particular domain and to set the correct bits from the control signals to the appropriate port. The FPGA 204 can be programmed via another port from a processor, for example. The FPGA 204 can also coordinate the transitions between Discovery Mode and Normal Mode as well as coordinate the operation of each.

The protocol analyzer chassis 200 further includes inter-chassis communication means, such as cable receptacles 206, 208, which are each adapted to receive a network cable, or "sync-cable," one in an upstream direction and one in a downstream direction. The cable receptacles 206, 208 may include, for example, RJ-45 jacks. Each cable carries control signals between adjacent chassis in a serial connection as described herein. Exemplary control signals include, but are not limited to, a data in signal 260, a data out signal 262, a clock in signal, and a clock out signal. The data in signal 260 and data out signal 262 may further include various component signals, for example, a run signal, a stop signal, a trigger signal, and a chassis discovery signal. As further described hereinbelow, each of the run, stop, trigger, and chassis discovery data signals can be included within a single protocol. Although the data in signal 260 and data out signal 262 are communicated via box to box communication, the data signals are particular to specific domains. In addition, it will be understood by those skilled in the art that the use of cable receptacles 206, 208, and accompanying cables can be replaced by wireless communications devices.

Each port can generate a trigger signal, which indicates that a trigger event or condition has occurred. After the trigger signal is generated, it is transmitted to each port in the domain across the connected chassis so that each port will respond as desired, typically capturing a specified range of communications for analysis, as previously mentioned.

Figure 3:
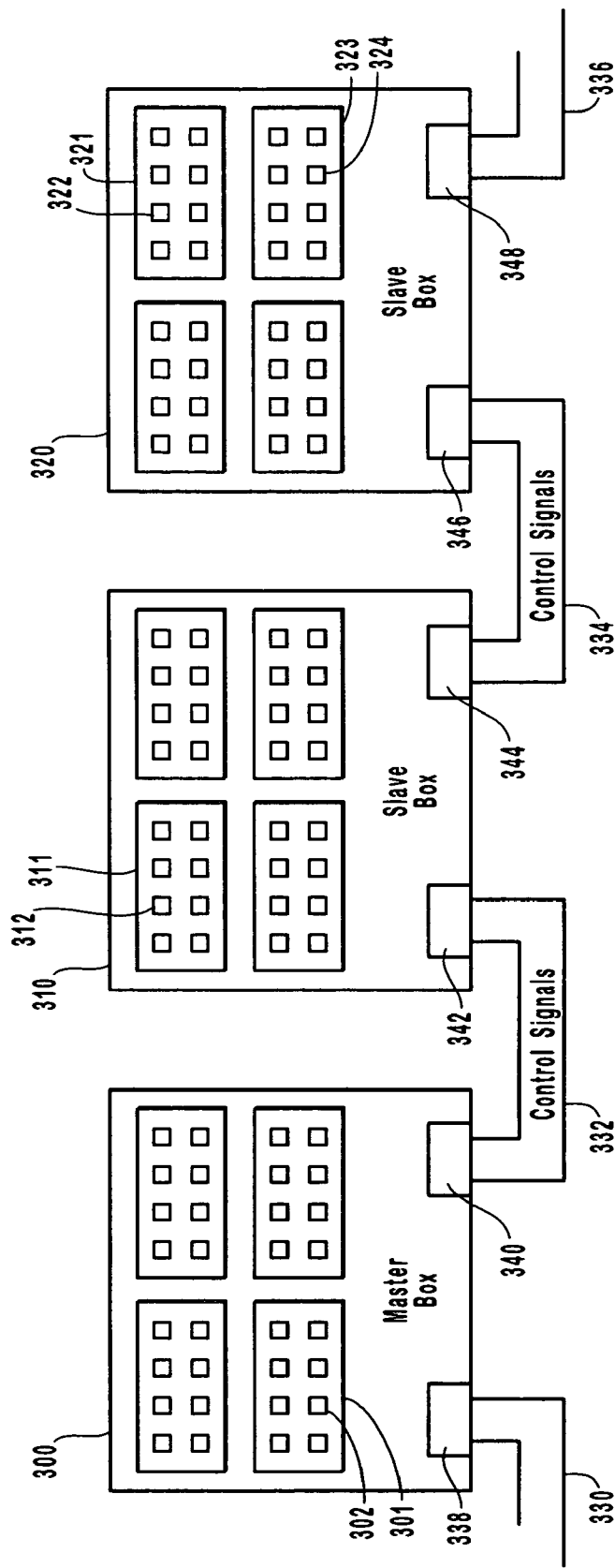
FIG. 3 is a block diagram representing a multi-chassis system according to embodiments of the invention.

Protocol analyzer chassis 200 may include an oscillator or clock 270 that operates at a certain frequency (such as 50 MHz) to generate a clock signal that is propagated to the other protocol analyzer chassis in the chain. Because the ports can often support a high data rate, the clock signal of the clock 270 is multiplied by the clock multiplier 280 and the resulting clock signal of the clock multiplier is propagated to the blades within the chassis and may be used to drive time stamp counters of each port of each blade. Each time stamp counter of each port is thus driven by the multiplied clock signal generated by the clock multiplier 280. The clock signals are transmitted as a clock out signal 256 and a clock in signal 258. The clock out signal 256, for example, is typically generated by a master box and is sent to one or more slave boxes (as shown in FIG. 3). The clock out signal 256 is multiplied and then used to run the time stamp counters of the ports in a particular domain. The clock in signal 258 may refer to the clock signal that is received from a previous master or slave box (shown in FIG. 3). The master box sends the clock to the first slave box, which in turn receives the clock and passes it on to the next slave box, if any, and so forth.

In various embodiments it may be preferable to have different clocks operating for box-to-box communication and for port-to-port communication. For example, the master box can generate a 50 MHz clock signal that will be used by all boxes for box-to-box communication. A 100 MHz timestamp clock may in turn be generated for the port-to-port communication.

Each chassis may be isolated or serially connected to other chassis via the sync-cables. Accordingly, FIG. 3 is a block diagram that illustrates a series of chassis that are connected by sync-cables 330, 332, 334, 336 in a particular topology. In one example, the sync-cables connect to each chassis using RJ-45 connectors which connect with RJ-45 jacks 338, 340, 342, 344, 346, 348 in each chassis. The sync-cables carry the control signals from one chassis to the next. For example, the chassis 300 is connected with the chassis 310 by the cable 332 and the chassis 310 is connected to the chassis 320 by the cable 334. Sync-cables 330 and 336 illustrate that the chassis chain may be extended in either direction. The chassis 300, 310 and 320 are not required to be co-located. Software can be used to detect any illegal connection, such as braches or loops in the chassis topology.

Each group of connected chassis can be configured as one or more than one sync-group. During normal operation, the most upstream chassis in a sync-group is designated as a master and has nothing connected to its upstream incoming cable receptacle (unless there is an upstream sync-group). Downstream chassis in a sync-group are designated to be slaves.

If the chain is logically broken into multiple chains, or sync-groups, no communication takes place between the sync-groups. This is accomplished via a control register in each chassis that specifies whether incoming information is to be ignored from either the upstream or downstream chassis. The most upstream chassis (which should be a master, otherwise it cannot be used), should be configured to ignore any information from its upstream side. Likewise, the most downstream chassis in a sync-group should be configured to ignore any information from its downstream side. Each master chassis, whether it is the most upstream chassis or not, is configured to ignore any information from its upstream side. This guarantees that each sync-group is isolated from each other and that any chains that are in Normal Mode are not interfered with should additional chassis be added to the beginning or end of a chain.

As illustrated by example in FIGS. 2 and 3, an illustrative chassis can support up to four blades and each blade can support up to eight ports. A "domain" refers to a group of ports that are bundled or logically connected together, and generally represents the number of simultaneous users that may use different ports within the sync group. The number of domains that may be supported in each sync group is limited only by the hardware resources available, but may be chosen such as to meet user requirements. One embodiment, for example, may include chassis that support 8 domains in each sync group. Any port in any chassis in a sync-group can be in any one of the domains. Because the chassis or blades are not necessarily of the same technology, it is possible to have different types of ports within a single domain.

Referring again to FIG. 3, depicted is a domain of ports. The domain illustrated in FIG. 3 includes the port 302 from a blade 301 of the chassis 300, a port 312 from a blade 311 of the chassis 310, a port 322 from the blade 321 of the chassis 320, and a port 324 from a blade 323 of the chassis 320. The domain illustrated by FIG. 3 thus shares ports that are located on different blades of different chassis.

For a given domain, there is typically a master chassis, illustrated in FIG. 3 as chassis 300. Methods as disclosed herein can determine which chassis and/or ports are available to a network and connected. A determination is also made as to which chassis is the master chassis and which chassis are slave chassis, illustrated in FIG. 3 as chassis 310, 320.

Figure 4:
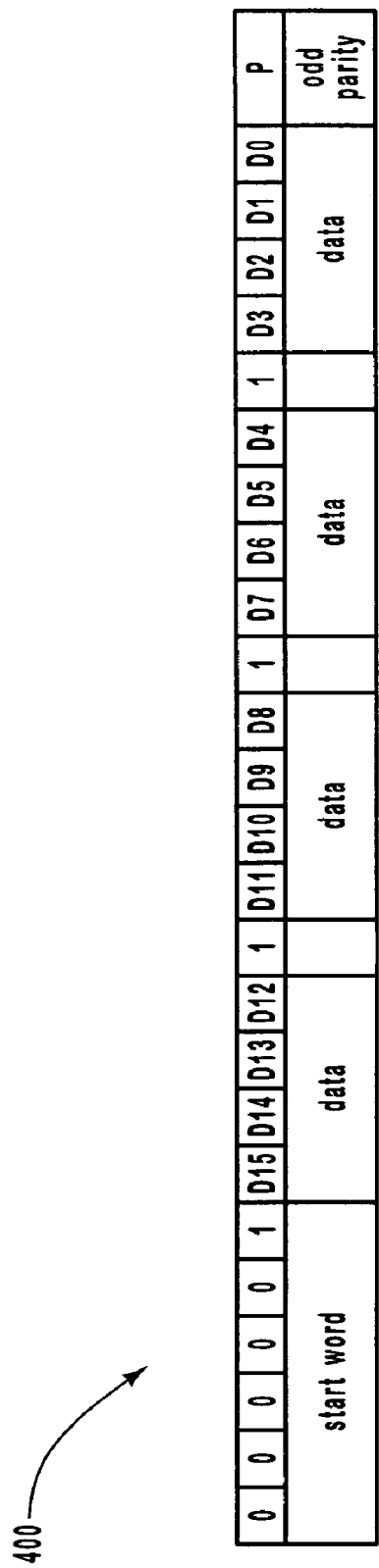
FIG. 4 depicts the protocol used for communicating between chassis according to embodiments of the invention.

Referring now to FIG. 4, depicted is an illustrative data packet or frame 400 of a protocol used for chassis-to-chassis communication according to embodiments of the invention. As defined herein, a "protocol" refers to a defined set of rules or formats that nodes in a telecommunication or computer network use when they communicate. Both nodes must recognize and observe the protocol. As illustrated in FIG. 4, one such protocol is a 26-bit frame 400 is used to provide for synchronization and the possibility of idle insertion between frames. Sixteen bits of data (D0-D15) are transferred in both the upstream and downstream directions, and are divided into two groups of eight bits each, 8 for run/stop, and 8 for trigger. Eight bits are used for run/stop and trigger because in this example system, eight domains are supported, thus requiring one bit for each domain. In addition, a six bit start word as well as three data field separators and one parity bit complete the example 26-bit frame.

In the depicted embodiment, the start word contains five 0's followed by a single 1. Each four-bit nibble is separated by a 1, such that the start word with five consecutive 0's can only occur at the beginning of a frame. A parity bit (representing odd parity) is included to provide some level of error checking. In between frames, i.e. after the parity bit of one frame and the start word of the following frame, 0's may be optionally inserted as idles. Frames received with a data error are ignored.

The data fields have different meanings depending on the mode (Discovery Mode vs. Normal Mode). For example, in one embodiment, Normal Mode bits D0-D7 represent the trigger state of domains 0-7, respectively, such that a 1 in any one bit position means that that domain has been triggered. Bits D8-D15 represents the run/stop state of Domains 0-7, respectively, such that a 1 in any one bit position means that that domain is currently running.

Figure 5:
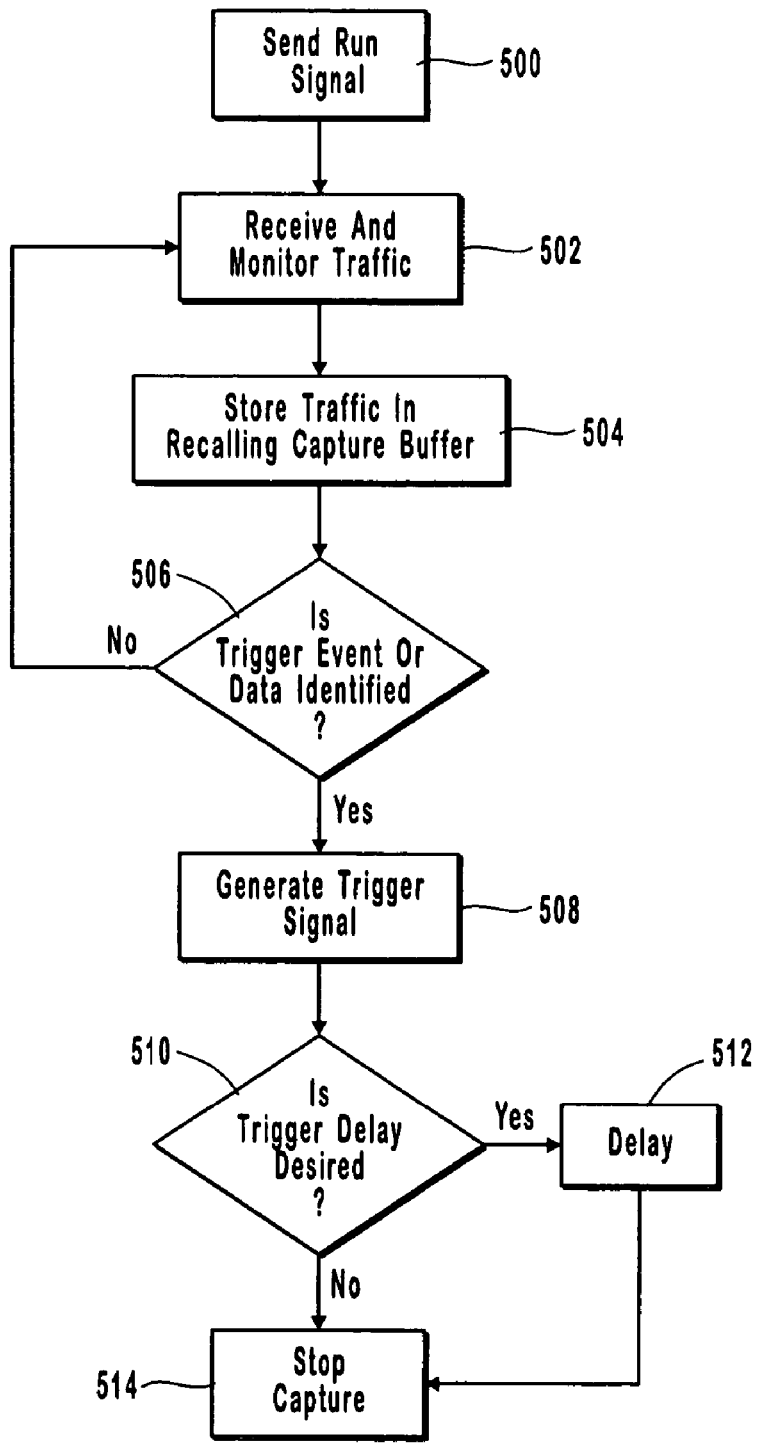
FIG. 5 is a block diagram representing illustrative methods according to embodiments of the invention.

Referring now to FIG. 5, depicted is a block diagram that is illustrative of a method of performing run/trigger operations with a revolving capture buffer according to the invention. Initially, a run signal is delivered to each port in a domain, as depicted by step 500. Each port (including any associated analyzers) then commences to receive network traffic and monitor it to identify network data of interest, as indicated by step 502. The network data is stored in a revolving capture buffer, as indicated by step 504. As the amount of network data that has been analyzed surpasses the capacity of the capture buffer, the oldest data in the capture buffer is overwritten by the most recently received network traffic data. Hence, the capture is revolving in that the older data is continually overwritten by newer data.

As indicated by decision block 506, the network traffic is continually monitored to identify network data of interest. If no data of interest is identified, receipt and monitoring of network traffic continues at step 502. If data if interest is identified, however, a trigger signal is generated, as indicated by step 508 and further discussed hereinabove. Optionally, the method next inquires whether a delay is desired before capturing data at each port in the domain, as indicated by decision block 510. A delay may be used either to ensure that an adequate amount of data is captured both before and after the trigger event occurs or to ensure that each of the ports synchronously triggers. Further details regarding methods of synchronizing triggering operations are presented in U.S. patent application Ser. No. 10/882,711, entitled "Synchronization of Timestamps to Compensate for Communication Latency Between Devices," filed Jun. 30, 2004, which was previously incorporated herein by reference. If a delay is desired, after it is performed, as indicated by step 512, the data capture continues. Alternatively, if a delay is not desired then the data capture ends immediately, as indicated by step 514, without the delay indicated by step 512.

Figure 6:
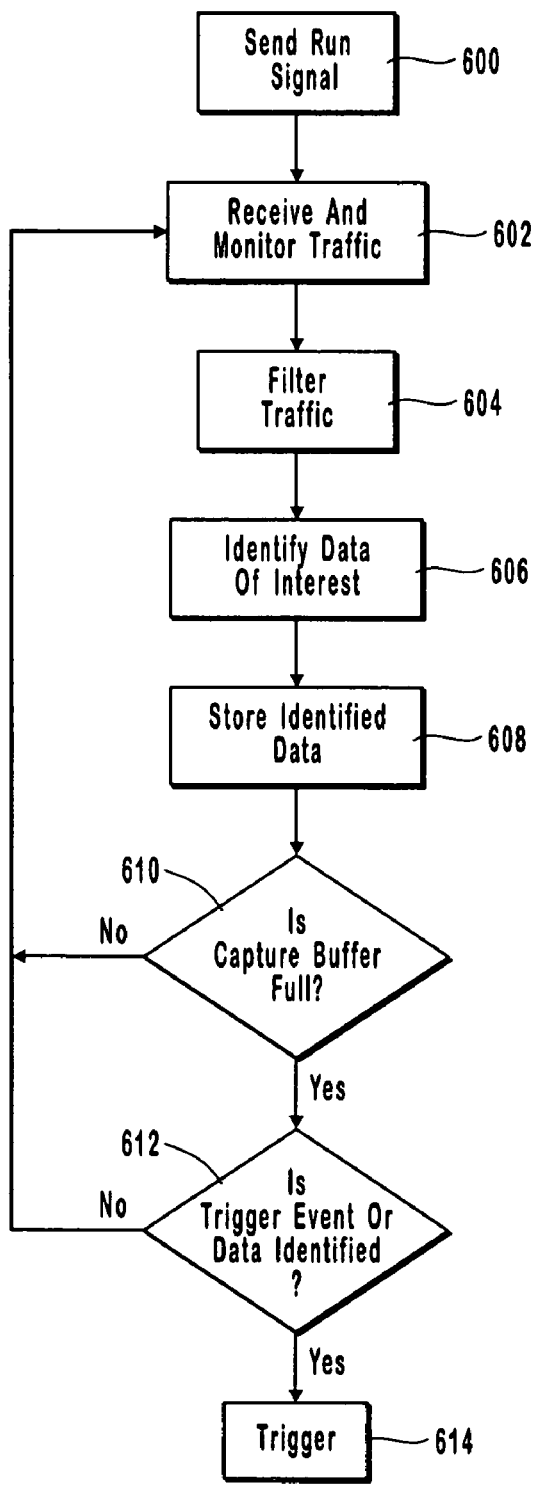
FIG. 6 is another block diagram representing illustrative methods according to embodiments of the invention.

Referring now to FIG. 6, depicted is a block diagram that is illustrative of a method of performing triggering operations in conjunction with filtering operations. After a run signal is delivered to each port in a domain, as indicated by step 600, each port (including any associated analyzers) commences to receive network traffic and monitor it to identify network data of interest, as indicated by step 602. A filter module in communication with each port filters the network traffic to identify network data or packets of interest, as indicated by step 604. If data of interest is identified, as indicated by step 606, the data of interest is stored in a capture buffer, as indicated by step 608.

Optionally, the methods may seek to identify specific triggering data, as indicated by step 612, the identification of which would initiate the generation of a trigger signal, as indicated by step 614. As previously mentioned, the trigger signal would cause each capture buffer in the domain of ports to capture data as instructed.

Alternatively, the system could be configured to continue capturing filtered data until a capture buffer is full. A capture buffer that is filled with data selected by the filtering process would then commence the generation of trigger signals for transmission to each port in the domain for a collective data capture.

Of course, the methods depicted in FIGS. 5 and 6 may be combined or otherwise modified to include both triggering and filtering operations as desired. It will also be understood that other operations and devices disclosed herein but not specifically depicted in FIGS. 5 and 6 may also be incorporated, in view of the disclosure herein, into the herein disclosed methods. In addition, trigger signals can be generated by other methods, such as manual instructions from a network administrator or automated controls from the protocol analyzer system.

In addition, the occurrence of a triggering event, such as the detection of network data of interest, may trigger the capture of data in each capture buffer at the same time without ceasing the analysis of the network data. Hence, a domain of ports may synchronously capture a series of events before stopping.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a protocol analyzer system in a computer network, a method for capturing network data of interest, the method comprising:

receiving communications traffic through a domain of ports, which represents a number of simultaneous users that use different ports within a sync group, that are on a protocol analyzer, the domain of ports logically grouping at least a first port from a first chassis of the sync group comprising a plurality of chassis and at least a first port from a second chassis of the sync group, wherein at least a second port from the first chassis and at least a second port from the second chassis are not logically grouped in the domain of ports, and wherein the logical grouping of ports allows a user to control the ports in the domain without affecting the ports not logically grouped in the domain;

monitoring the communications traffic through one or more analyzer modules to identify data of interest, each analyzer module being in communication with and receiving the communications traffic through at least one of the ports in the domain of ports; and delivering one or more control signals between the plurality of chassis using a serial protocol, wherein the control signals coordinate the operation of each port in the domain of ports.

2. The method as in claim 1, wherein each chassis further comprises a field programmable gate array, each field programmable gate array capable of analyzing the serial protocol to identify which of the one or more control signals is directed to which ports located at its respective chassis.

3. The method as in claim 1, wherein at least one control signal comprises a trigger signal for propagation to each of the ports in the domain, wherein the trigger signal triggers a capture buffer in communication with each port in the domain to capture a selected portion of the communications traffic.

4. The method as in claim 3, wherein the trigger signal is generated at a port when selected network data of interest is identified or when selected characteristics of the communications are identified.

5. The method as in claim 3, wherein the capture buffer operates by storing a selected portion of the communications traffic, the capture buffer operating by writing the newly received communications traffic over the oldest communications traffic stored in the capture buffer, wherein the trigger signal directs the capture buffer to stop writing new data into the capture buffer at a specified time, thus preserving a selected portion of the communications traffic.

6. The method as in claim 5, wherein the trigger signal directs the capture buffer to capture a selected portion of the communications traffic by continuing to capture network data for a selected period of time after the trigger signal is received, thereby storing in the capture buffer data network data received through the port both before and after the network data of interest is identified.

7. The method as in claim 1, wherein the control signals identify whether each port in the domain should be running or stopped and whether each port should trigger.

8. The method as in claim 1, further comprising generating a clock signal in one of the chassis and propagating that signal to at least one additional chassis via cables that are in communication with each chassis.

9. The method as in claim 1, further comprising: filtering the communications traffic to identify selected portions of the communications traffic that it is desired to store in a capture buffer; and storing only the identified portions of the communications traffic in the capture buffer.

10. The method as in claim 9, wherein:
the trigger signal is generated at a port when the port's associated capture buffer is full; and
the trigger signal is propagated to each port in the domain and acts to stop the capture of data capture buffer associated with each port in the domain.

11. The method as in claim 1, wherein the serial protocol comprises:
a start word which identifies the serial protocol;
a plurality of data bits which indicate whether the devices connected to a particular port should be running and/or triggering;
at least one separator bit for separating the data bits into groupings; and
one parity bit to indicate the end of the serial protocol.

12. In a multi-chassis protocol analyzer system in a computer network, a method for capturing network data of interest in coordination across the multiple chassis, the method comprising:
configuring a domain to logically group at least a first port from a first blade of a first chassis and at least a first port from a second blade of a second chassis, such that a user can control the ports logically grouped in the domain without affecting the ports not in the domain, wherein at least a second port from the first blade and at least a second port from the second blade are not included in the domain of ports, each port in the domain being in communication with a respective analyzer module and a respective capture buffer;
at each analyzer module, monitoring data transmitted via the communications network in order to identify network data of interest; and
in response to an analyzer module attached to one of the ports in the domain identifying the network data of interest, triggering each capture buffer in communication with each port in the domain to capture a desired portion of the data transmitted via the communications network.

13. The method as in claim 12, wherein each chassis further comprises a field programmable gate array, each field programmable gate array capable of analyzing a serial protocol that is communicated between the chassis to identify and direct control signals which coordinate the operation of each port in the domain of ports.

14. The method as in claim 12, wherein each capture buffer operates by storing a selected portion of the data transmitted via the communications network, the capture buffer operating by writing the newly received data transmitted via the communications network over the oldest data transmitted via the communications network stored in the capture buffer, wherein a trigger signal directs the capture buffer to stop writing new data into the capture buffer at a specified time, thus preserving a selected portion of the data transmitted via the communications network.

15. The method as in claim 14, wherein the trigger signal directs the capture buffer to capture a selected portion of the data transmitted via the communications network by continuing to capture network data for a selected period of time after the trigger signal is received, thereby storing in the capture buffer data network data received through the port both before and after the network data of interest is identified.

16. The method as in claim 12, further comprising:
filtering the communications traffic to identify selected portions of the communications traffic that it is desired to store in the capture buffer; and
storing only the identified portions of the communications traffic in the capture buffer.

17. The method as in claim 12, wherein:
the step of triggering each capture buffer is performed by generating a trigger signal at a port when the port's associated capture buffer is full; and
the trigger signal is propagated to each port in the domain and acts to stop the capture of data in the capture buffer associated with each port in the domain.

18. The method as in claim 12, wherein the step of triggering each capture buffer is performed by generating a trigger signal at a port when selected network data of interest is identified or when selected characteristics of the communications are identified.

19. In a protocol analyzer system in a computer network, a method for capturing network data of interest, the method comprising:
providing a multi-chassis protocol analyzer system, each chassis comprising first and second cable receptacles for inter-chassis communications and housing at least one blade, each blade comprising at least one port for connecting to a computer network, each port further being in communication with both a capture buffer and an analyzer module;
logically grouping a plurality of the ports into a domain, which includes different types of ports, located over at least two of the chassis, the domain of ports comprising at least a first port from a first blade of a first chassis and at least a first port from a second blade of a second chassis, wherein at least a second port from the first blade and a second port from the second blade are not included in the domain of ports, the logical grouping of the ports in the domain allowing a user to control the ports in the domain without affecting the ports not included in the domain;
transmitting, through at least one of the first and second cable receptacles, a serial protocol containing a run signal to place the domain of ports in a run mode whereby:
communications traffic is received through the domain of ports; and
the communications traffic is monitored by the analyzer modules in communication with the domain of ports to identify data of interest; and
transmitting, through at least one of the first and second cable receptacles, a serial protocol containing a trigger signal for propagation to each of the ports in the domain, the trigger signal operable to trigger the capture buffer in communication with each port in the domain to capture a selected portion of the communications traffic.

20. The method as in claim 19, wherein the trigger signal is generated in response to an analyzer module detecting network data of interest or when selected characteristics of the communications traffic are identified.

21. The method as in claim 19, further comprising: filtering the communications traffic in the analyzer module to identify selected portions of the communications traffic that it is desired to store in a capture buffer; and storing only the identified portions of the communications traffic in the capture buffer.

22. The method as in claim 21, wherein the trigger signal is generated in response to a capture buffer being filled with the identified portions of the communications traffic.

23. The method as in claim 19, wherein each chassis further comprises a field programmable gate array, each field programmable gate array analyzing the serial protocol to identify which of the one or more control signals is directed to which ports located at its respective chassis.

24. The method as in claim 19, wherein the first and second cable receptacles comprise R J-45 jacks.

25. A protocol analyzer system for identifying and capturing network data of interest, comprising:
a sync group including a first chassis and a second chassis, each chassis comprising:
at least one blade, each blade comprising:
a capture buffer for capturing network data of interest;
an analyzer for monitoring network traffic, identifying network data of interest, and triggering the capture of the network data of interest in the capture buffer;
at least a first port for receiving network traffic and routing it to the capture buffer and/or the analyzer, wherein the at least first port in the first chassis and the at least first port in the second chassis are logically grouped to comprise a domain of ports, which represents a number of simultaneous users that use different ports within the sync group, and wherein at least a second port in the first chassis and at least a second port in the second chassis are not included in the domain of ports such that the ports outside the domain are not affected by user control of the ports in the domain; and
a field programmable gate array capable of analyzing a serial protocol, which comprises one or more control signals, communicated between the first chassis and the second chassis to identify which of one or more control signals in the serial protocol is applicable to the ports located on each chassis.

26. The system as in claim 25, wherein the analyzer comprises: a filter component, wherein the filter component is operable to monitor the network traffic to identify data of interest and direct the storage of the data of interest in the capture buffer; and a trigger component, wherein the trigger component is operable to direct each port in the domain to capture a selected portion of the network traffic when the trigger component detects selected data of interest.

27. The system as in claim 25, wherein the data of interest comprises statistical information relating to the network traffic.

28. The system as in claim 25, wherein the data of interest comprises statistical information relating to transactional events between components interconnected via a communications network.

29. The system as in claim 25, wherein the data captured by the capture buffer comprises data that was transmitted via a communications network both before and after the trigger condition was satisfied.

30. The system as in claim 25, wherein the first and second chassis are interconnected by one or more dedicated cables for transmitting inter-chassis control signals.

* * * * *